(12) United States Patent
Yang et al.

(10) Patent No.: US 12,738,558 B2
(45) Date of Patent: Sep. 15, 2026

(54) BATTERY, POWER CONSUMING DEVICE, AND METHOD AND DEVICE FOR MANUFACTURING BATTERY

(71) Applicant: CONTEMPORARY AMPEREX TECHNOLOGY (HONG KONG) LIMITED, Hong Kong (CN)

(72) Inventors: Piaopiao Yang, Ningde City (CN); Yao Li, Ningde City (CN); Xiaobo Chen, Ningde City (CN); Mingguang Gu, Ningde City (CN); Xianda Li, Ningde City (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 621 days.

(21) Appl. No.: 18/344,870

(22) Filed: Jun. 30, 2023

(65) Prior Publication Data

US 2023/0344033 A1 Oct. 26, 2023

Related U.S. Application Data

(63) Continuation of application No. PCT/CN2021/109128, filed on Jul. 29, 2021.

(51) Int. Cl.
*H01M 10/653* (2014.01)
*H01M 10/6554* (2014.01)
(Continued)

(52) U.S. Cl.
CPC ..... *H01M 10/653* (2015.04); *H01M 10/6554* (2015.04); *H01M 10/6556* (2015.04);
(Continued)

(58) Field of Classification Search
CPC ..... H01M 10/60–667; H01M 50/3425; H01M 2200/20
See application file for complete search history.

(56) References Cited

U.S. PATENT DOCUMENTS

2004/0157115 A1 8/2004 Bouffard et al.
2015/0325840 A1* 11/2015 Mizuike ................ H01M 4/604 429/213
(Continued)

FOREIGN PATENT DOCUMENTS

CN 110843060 A 2/2020
CN 111640888 A 9/2020
(Continued)

OTHER PUBLICATIONS

Notification of Grant of Invention Patent Right (with English Machine Translation), mailed Jun. 17, 2025, for corresponding Chinese Patent Application Serial No. 202180006698.6.
(Continued)

*Primary Examiner* — Scott J. Chmielecki
(74) *Attorney, Agent, or Firm* — K&L Gates LLP

(57) ABSTRACT

Provided are a battery, a power consuming device, and a method and device for manufacturing a battery. The battery comprises: a plurality of battery cells, a first wall of the battery cell being provided with a pressure relief mechanism that is used to be actuated, when an internal pressure or temperature of the battery cell reaches a threshold, to relieve the internal pressure; and a thermal management component used to accommodate a fluid to adjust the temperature of the battery cell, wherein a first surface of the thermal management component is attached to the first wall, the first surface is provided with an avoidance region corresponding to the pressure relief mechanism, the avoidance region is used to
(Continued)

provide a deformation space for the pressure relief mechanism when the pressure relief mechanism is actuated.

20 Claims, 7 Drawing Sheets

(51) Int. Cl.
*H01M 10/6556* (2014.01)
*H01M 50/209* (2021.01)
*H01M 50/342* (2021.01)

(52) U.S. Cl.
CPC ..... *H01M 50/209* (2021.01); *H01M 50/3425* (2021.01); *H01M 2200/20* (2013.01); *H01M 2220/20* (2013.01)

(56) References Cited

U.S. PATENT DOCUMENTS

| | | | | |
|---|---|---|---|---|
| 2019/0229384 | A1* | 7/2019 | Tasiopoulos | H01M 10/625 |
| 2021/0119300 | A1* | 4/2021 | Li | H01M 50/375 |
| 2023/0056487 | A1* | 2/2023 | Asanin | H01M 50/383 |

FOREIGN PATENT DOCUMENTS

| | | | |
|---|---|---|---|
| CN | 213026308 | U | 4/2021 |
| CN | 213584016 | U | 6/2021 |
| CN | 213601965 | U | 7/2021 |
| CN | 213782158 | U | 7/2021 |
| DE | 102012018060 | A1 | 3/2014 |
| GB | 1336568 | A | 11/1973 |
| JP | 2017147128 | A | 8/2017 |
| JP | 2018526772 | A | 9/2018 |
| WO | 2020026973 | A1 | 2/2020 |

OTHER PUBLICATIONS

International Search Report received in the corresponding International Application PCT/CN2021/109128, mailed Mar. 3, 2022.
Written Opinion received in the corresponding International Application PCT/CN2021/109128, mailed Mar. 3, 2022.
The extended European search report received in the corresponding European Application 21951113.6, mailed Apr. 16, 2024.
Notice of Reasons for Refusal received in the corresponding Japanese Application 2023-506041, mailed Feb. 26, 2024.

* cited by examiner

BATTERY, POWER CONSUMING DEVICE, AND METHOD AND DEVICE FOR MANUFACTURING BATTERY

CROSS REFERENCE TO RELATED APPLICATIONS

The present application is a continuation of International Application PCT/CN2021/109128, filed on Jul. 29, 2021 and entitled "BATTERY, POWER CONSUMING DEVICE, AND METHOD AND DEVICE FOR MANUFACTURING BATTERY", the entire disclosure of which is incorporated herein by reference.

TECHNICAL FIELD

The present application relates to the technical field of batteries, and in particular to a battery, a power consuming device, and a method and device for manufacturing the battery.

BACKGROUND ART

Energy conservation and emission reduction are the key to the sustainable development of the automobile industry. In this case, electric vehicles have become an important part of the sustainable development of the automotive industry due to their advantages in energy conservation and environmental protection. For the electric vehicles, the battery technology is an important factor related to their development.

In the development of the battery technology, in addition to improving the performance of batteries, the safety is also a non-negligible issue. If the safety of batteries cannot be guaranteed, the batteries cannot be used. Therefore, how to enhance the safety of batteries is an urgent technical problem to be solved in the battery technology.

SUMMARY OF THE INVENTION

The present application provides a battery, a power consuming device, and a method and device for manufacturing a battery, which can enhance safety of the battery.

According to a first aspect, a battery is provided, comprising: a plurality of battery cells, a first wall of the battery cell being provided with a pressure relief mechanism that is used to be actuated, when an internal pressure or temperature of the battery cell reaches a threshold, to relieve the internal pressure; and a thermal management component used to accommodate a fluid to adjust the temperature of the battery cell, wherein a first surface of the thermal management component is attached to the first wall, the first surface is provided with an avoidance region corresponding to the pressure relief mechanism, the avoidance region is configured to provide a deformation space for the pressure relief mechanism when the pressure relief mechanism is actuated, a destruction assisting substance is provided in the avoidance region, and the destruction assisting substance is used to assist in destroying the thermal management component when the pressure relief mechanism is actuated, so that the fluid is discharged from the inside of the thermal management component.

Therefore, in the battery according to the embodiment of the present application, the thermal management component is provided below the plurality of battery cells, the first surface of the thermal management component is provided with the avoidance region corresponding to the pressure relief mechanism, and the destruction assisting substance is provided in the avoidance region. In this way, when the battery cells are subjected to thermal runaway, the pressure relief mechanism is actuated, and the destruction assisting substance can assist in the destruction of the thermal management component by the emissions discharged from the battery cells, so that the thermal management component can be more easily destroyed, and thus the internal fluid is discharged from the thermal management component in a timely manner to reduce the temperature in a timely manner, especially reduce, in a timely manner, the temperature of the thermally runaway battery cells, so that a risk of thermal diffusion inside the battery can be reduced. This can not only reduce economic losses, but also ensure life safety of people.

In some embodiments, the destruction assisting substance is used to release oxygen under the action of emissions of the battery cell when the pressure relief mechanism is actuated.

Since the destruction assisting substance can release oxygen under the action of the emissions, which in turn can exacerbate the combustion of the thermally runaway battery cells, it is possible to quickly reach a melting temperature of the thermal management component and break through the thermal management component to the greatest extent, so as to reduce the temperature in a timely manner.

In some embodiments, the destruction assisting substance includes at least one of zinc sulfate, potassium permanganate, and potassium chlorate.

In some embodiments, the destruction assisting substance is used to release heat under the action of the emissions of the battery cell when the pressure relief mechanism is actuated.

When the destruction assisting substance releases heat under the action of the emissions, the melting of the thermal management component can be accelerated, and then the thermal management component is further destroyed in a larger area, thus achieving a cooling effect.

In some embodiments, the destruction assisting substance includes at least one of iron oxide, ferroferric oxide, manganese dioxide, vanadium pentoxide, and chromium oxide.

Considering that aluminum may be used as the material of the thermal management component, the destruction assisting substance may be provided based on an aluminothermic reaction.

In some embodiments, the avoidance region is a through hole in the thermal management component.

When the avoidance region is the through hole, the emissions discharged by the pressure relief mechanism can be quickly discharged through the through hole, and the internal pressure of the thermally runaway battery cells is released more quickly.

In some embodiments, the destruction assisting substance is disposed on a side wall of the through hole.

In some embodiments, the avoidance region is a first groove in the thermal management component.

In some embodiments, the destruction assisting substance is disposed on a side wall of the first groove.

In some embodiments, the destruction assisting substance has a thickness ranging from 3 mm to 10 mm.

In some embodiments, the destruction assisting substance is disposed on a bottom wall of the first groove.

In some embodiments, the destruction assisting substance has a thickness less than or equal to 2 mm.

In some embodiments, the bottom wall of the first groove is provided with a second groove, and the destruction assisting substance is disposed on a bottom wall of the second groove.

In some embodiments, the destruction assisting substance has a thickness less than or equal to the depth of the second groove.

In some embodiments, the destruction assisting substance is wrapped in an encapsulation film.

In some embodiments, the encapsulation film is bonded and fixed in the avoidance region.

In some embodiments, the destruction assisting substance is in powder form.

In some embodiments, the encapsulation film is an aluminum-plastic film, a PP film, or a PC film.

In some embodiments, the thermal management component is made of aluminum.

In some embodiments, the thermal management component comprises a first thermally conductive plate and a second thermally conductive plate, the first thermally conductive plate being located between the first wall and the second thermally conductive plate and attached to the first wall, a first region of the first thermally conductive plate having a through hole, a second region of the second thermally conductive plate corresponding to the first region, and the second region protruding in a direction away from the first thermally conductive plate to form the avoidance region.

In some embodiments, the thermal management component comprises a first thermally conductive plate and a second thermally conductive plate, the first thermally conductive plate being located between the first wall and the second thermally conductive plate and attached to the first wall, a first region of the first thermally conductive plate being provided with a third groove that is the avoidance region, a second region of the second thermally conductive plate corresponding to the first region, the second region being provided with a fourth groove in which the third groove is located, and a flow channel being formed between a side wall of the third groove and a side wall of the fourth groove to accommodate the fluid.

According to a second aspect, a power consuming device is provided, comprising a battery in the first aspect for supplying electric energy.

In some embodiments, the power consuming device is a vehicle, a ship, or a spacecraft.

According to a third aspect, a method for manufacturing a battery is provided, comprising: providing a plurality of battery cells, a first wall of the battery cell being provided with a pressure relief mechanism that is used to be actuated, when an internal pressure or temperature of the battery cell reaches a threshold, to relieve the internal pressure; and providing a thermal management component used to accommodate a fluid to adjust the temperature of the battery cell, wherein a first surface of the thermal management component is attached to the first wall, the first surface is provided with an avoidance region corresponding to the pressure relief mechanism, the avoidance region is configured to provide a deformation space for the pressure relief mechanism when the pressure relief mechanism is actuated, a destruction assisting substance is provided in the avoidance region, and the destruction assisting substance is used to assist in destroying the thermal management component when the pressure relief mechanism is actuated, so that the fluid is discharged from the inside of the thermal management component.

According to a fourth aspect, a device for manufacturing a battery is provided, comprising a module for implementing the method according to the third aspect.

Figure 1:
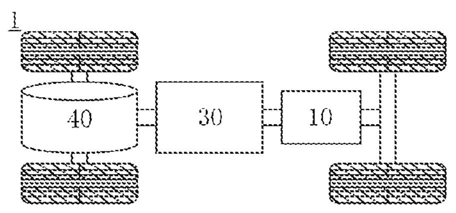
FIG. 1 is a schematic structural diagram of a vehicle disclosed in an embodiment of the present application.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

In the present application, a battery cell may include a primary battery or a secondary battery, for example, may be a lithium-ion battery, a lithium-sulfur battery, a sodium-lithium-ion battery, a sodium-ion battery, a magnesium-ion battery, etc., which will not be limited in the embodiments of the present application. The battery cell may be cylindrical, flat, cuboid or in another shape, which will not be limited in the embodiments of the present application. The battery cell is generally classified into three types depending on the way of package: a cylindrical battery cell, a cuboid battery cell, and a pouch battery cell, which will also not be limited in the embodiments of the present application.

A battery mentioned in the embodiments of the present application refers to a single physical module comprising one or more battery cells to provide a higher voltage and capacity. For example, the battery mentioned in the present application may include a battery module, a battery pack, etc. The battery pack generally comprises a case for enclosing one or more battery cells. The case can prevent liquid or other foreign matters from affecting the charging or discharging of the battery cell.

The battery cell comprises an electrode assembly and an electrolyte, the electrode assembly comprising a positive electrode plate, a negative electrode plate, and a separator. The battery cells operate mainly by means of metal ions moving between the positive electrode plate and the negative electrode plate. The positive electrode plate comprises a positive electrode current collector and a positive electrode active material layer, the positive electrode active material layer being covered on a surface of the positive electrode current collector, with the current collector not covered with the positive electrode active material layer protruding from the current collector covered with the positive electrode active material layer, and the current collector not covered with the positive electrode active material layer serving as a positive electrode tab. Taking a lithium ion battery as an example, the positive electrode current collector may be made of aluminum, and a positive electrode active material may be lithium cobalt oxide, lithium iron phosphate, ternary lithium, lithium manganate, etc. The negative electrode plate comprises a negative electrode current collector and a negative electrode active material layer, the negative electrode active material layer being covered on a surface of the negative electrode current collector, the current collector not covered with the negative electrode active material layer protruding from the current collector covered with the negative electrode active material layer, and the current collector not covered with the negative electrode active material layer serving as a negative electrode tab. The negative electrode current collector may be made of copper, and a negative electrode active material may be carbon, silicon, etc. In order to ensure that no fusing occurs when a large current passes, a plurality of positive electrode tabs are provided and are stacked together, and a plurality of negative electrode tabs are provided and are stacked together. The separator may be made of PP, PE, etc. In addition, the electrode assembly may have a wound structure or a laminated structure, which will not be limited in the embodiments of the present application. The development of battery technology needs to consider many design factors at the same time, such as energy density, cycle life, discharge capacity, charge-discharge rate, and other performance parameters, and also needs to consider the safety of the battery.

For a battery, the main safety hazards come from charging and discharging processes. In order to improve the safety performance of the battery, a pressure relief mechanism is usually provided for a battery cell. The pressure relief mechanism refers to an element or component that is actuated, when an internal pressure or temperature of the battery cell reaches a predetermined threshold, to relieve the internal pressure or heat. The predetermined threshold may be adjusted based on different design requirements. The predetermined threshold may depend on materials of one or more of the positive electrode plate, the negative electrode plate, the electrolyte, and the separator in the battery cell. The pressure relief mechanism may be an element or component that is sensitive to pressure or temperature, that is, when the internal pressure or temperature of the battery cell reaches the predetermined threshold, the pressure relief mechanism is actuated, so as to form a channel for relief of the internal pressure or heat.

The "actuation" mentioned in the present application means that the pressure relief mechanism acts, so that the internal pressure and heat of the battery cell can be relieved. Actions produced by the pressure relief mechanism may include, but are not limited to, at least a part of the pressure relief mechanism being cracked, torn, or melted, etc. After the pressure relief mechanism is actuated, high-temperature and high-pressure substances inside the battery cell are discharged outward from the pressure relief mechanism as emissions. In this way, the pressure of the battery cell can be relieved under a condition of a controllable pressure or temperature, thereby avoiding the occurrence of potentially more serious accidents.

The emissions from the battery cell mentioned in the present application include, but are not limited to, an electrolyte, dissolved or split positive and negative electrode plates, fragments of a separator, a high-temperature and high-pressure gas generated by a reaction, flames, etc.

The pressure relief mechanism on the battery cell has an important influence on the safety of the battery. For example, when a battery cell is short-circuited, overcharged, etc., the battery cell may be internally subjected to thermal runaway, so that the pressure or temperature may suddenly rise. In this case, the internal pressure and heat can be released outward by means of the actuation of the pressure relief mechanism to prevent explosion or fire of the battery cell.

In a current design solution of the pressure relief mechanism, the main concern is to release the high pressure and high heat inside the battery cell, that is, to discharge the emissions to the outside of the battery cell. However, in order to ensure an output voltage or current of the battery, a plurality of battery cells are often required and are electrically connected to each other via a busbar component. Specifically, the busbar component is configured to implement electrical connection between the plurality of battery cells, such as parallel connection, series connection, or series-parallel connection. The busbar component may implement the electrical connection between the battery cells by connecting electrode terminals of the battery cells. In some embodiments, the busbar component may be fixed to the electrode terminals of the battery cells by means of welding. Corresponding to the "high-voltage chamber", the electrical connection formed by the busbar component may also be referred to as "high-voltage connection".

The emissions discharged from the inside of a battery cell may cause short circuit of other battery cells. For example, when two busbar components are electrically connected to each other via discharged metal scraps, the battery will be short-circuited, so that there is a potential safety hazard. In addition, the high-temperature and high-pressure emissions are discharged in a direction of the pressure relief mechanism provided in the battery cell, and more specifically may be discharged in a direction of a region where the pressure relief mechanism is actuated. The strength and destructive power of such emissions may be great or may even be enough to break through one or more structures in this direction, causing further safety problems.

In view of this, a thermal management component may be provided in the battery, and a surface of the thermal management component is attached to the surface of the battery cell provided with the pressure relief mechanism. In addition, the thermal management component may be further provided with an avoidance region that can provide a deformation space for the pressure relief mechanism when the pressure relief mechanism is actuated.

On one hand, the thermal management component is used to accommodate a fluid to adjust the temperature of a plurality of battery cells. The fluid here may be a liquid or a gas, and adjusting the temperature refers to heating or cooling the plurality of battery cells. In the case of cooling or reducing the temperature of the battery cells, the thermal management component is used to accommodate the cooling fluid to reduce the temperature of the plurality of battery cells. In this case, the thermal management component may also be referred to as a cooling component, a cooling system, a cooling plate, etc. The fluid accommodated by the thermal management component may also be referred to as a cooling medium or a cooling fluid, and more specifically, may be referred to as a cooling liquid or a cooling gas. In addition, the thermal management component may also be used for heating the plurality of battery cells to raise the temperature thereof, which will not be limited in the embodiments of the present application. Optionally, the fluid may circulate to achieve a better temperature adjustment effect. Optionally, the fluid may be water, a mixture of water and ethylene glycol, air, etc.

On the other hand, when the pressure relief mechanism is actuated, the avoidance region provides the deformation space for the pressure relief mechanism, so that the pressure relief mechanism can be opened smoothly to release the emissions in the battery cell. In addition, since the thermal management component accommodates the fluid, the fluid can also reduce the temperature of the battery cell to prevent explosion of the battery cell. For example, the emissions in the battery cell may destroy the thermal management component, so that the fluid inside the thermal management component flows out to reduce the temperature of the battery cell.

Therefore, in order to ensure that the emissions discharged from the battery cell can destroy the thermal management component after the pressure relief mechanism of the thermally runaway battery cell is actuated, so that the fluid in the thermal management component flows out to achieve fire extinguishing and cooling effects, an assisting destruction substance is provided in the avoidance region of the thermal management component in the embodiments of the present application, and the assisting destruction substance can assist in destruction of the thermal management component when the pressure relief mechanism is actuated.

The technical solutions described in the embodiments of the present application are all applicable to various devices using a battery, such as mobile phones, portable apparatuses, laptops, battery cars, electric toys, electric tools, electric vehicles, ships, and spacecraft. For example, the spacecrafts include airplanes, rockets, space shuttles, space vehicles, etc.

It should be understood that the technical solutions described in the embodiments of the present application are not only applicable to the apparatuses described above, but also applicable to all apparatuses using a battery. However, for the sake of brevity of description, the following embodiments will be described taking an electric vehicle as an example.

For example, FIG. 1 shows a schematic structural diagram of a vehicle 1 according to an embodiment of the present application. The vehicle 1 may be a fuel vehicle, a gas vehicle, or a new-energy vehicle. The new-energy vehicle may be a battery electric vehicle, a hybrid vehicle, an extended-range vehicle, etc. The vehicle 1 may be internally provided with a motor 40, a controller 30 and a battery 10. The controller 30 is used to control the battery 10 to supply power to the motor 40. For example, the battery 10 may be provided at the bottom or the head or the tail of the vehicle 1. The battery 10 may be used to supply power to the vehicle 1. For example, the battery 10 can serve as a power source for operating the vehicle 1 for use in a circuit system of the vehicle 1, for example, to meet the working power demand of the vehicle 1 during startup, navigation and running. In another embodiment of the present application, the battery 10 can not only serve as a power source for operating the vehicle 1, but also serve as a power source for driving the vehicle 1, instead of or partially instead of fuel or natural air, to provide driving power for the vehicle 1.

The battery may comprise a plurality of battery cells in order to meet different power demands, with the plurality of battery cells being in series connection, in parallel connection, or in series-parallel connection. The series-parallel connection refers to a combination of series connection and parallel connection. The battery may also be referred to as a battery pack. Optionally, the plurality of battery cells may first be in series connection or in parallel connection or in series-parallel connection to constitute a battery module, and then a plurality of battery modules are in series connection or in parallel connection or in series-parallel connection to constitute a battery. That is to say, the plurality of battery cells may directly constitute the battery or may first constitute the battery modules that may then constitute the battery.

Figure 2:
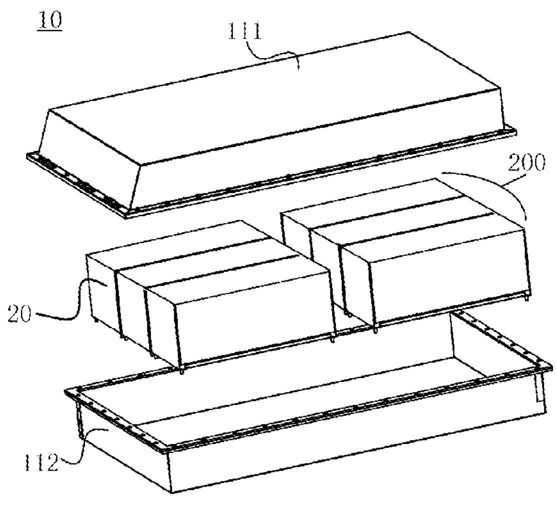
FIG. 2 is a schematic exploded structural diagram of a battery disclosed in an embodiment of the present application.

For example, as shown in FIG. 2, which is a schematic structural diagram of a battery 10 according to an embodiment of the present application, the battery 10 may comprise at least one battery module 200. The battery module 200 comprises a plurality of battery cells 20. The battery 10 may further comprise a case that has a hollow structure inside, and the plurality of battery cells 20 are accommodated in the case. As shown in FIG. 2, the case may comprise two portions, which are referred to herein as a first portion 111 and a second portion 112. The first portion 111 and the second portion 112 are snap-fitted together. The first portion 111 and the second portion 112 may be shaped depending on the shape of the combination of battery modules 200, and at least one of the first portion 111 and the second portion 112 has an opening. For example, as shown in FIG. 2, the first portion 111 and the second portion 112 may both be a hollow cuboid and each have only one face that is an open face, an opening of the first portion 111 and an opening of the second portion 112 are disposed opposite to each other, and the first portion 111 and the second portion 112 are snap-fitted to each other to form the case having an enclosed chamber. For another example, different from what is shown in FIG. 2, only one of the first portion 111 and the second portion 112 may be a hollow cuboid having an opening, and the other may be plate-shaped to cover the opening. For example, taking an example herein in which the second portion 112 is a hollow cuboid and has only one face that is an open face, while the first portion 111 is plate-shaped, the first portion 111 covers the opening of the second portion 112 to form a case having an enclosed chamber that may be used to accommodate the plurality of battery cells 20. The plurality of battery cells 20 are combined in parallel connection, in series connection, or in series-parallel connection, and then disposed in the case which is formed after the first portion 111 and the second portion 112 are snap-fitted together.

Optionally, the battery 10 may further has other structures, which will not be described in detail herein. For example, the battery 10 may further comprise a busbar component for achieving the electric connection, such as parallel connection, series connection, or series-parallel connection, between the plurality of battery cells 20. Specifically, the busbar component may achieve the electrical connection between the battery cells 20 by means of connecting electrode terminals of the battery cells 20. Further, the busbar component may be fixed to the electrode terminals of the battery cells 20 by means of welding. The electric energy of the plurality of battery cells 20 may be further led out by means of an electrically conductive mechanism passing through the case.

Figure 3:
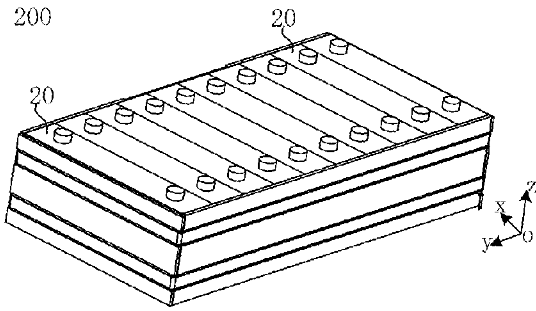
FIG. 3 is a schematic partial structural diagram of a battery module disclosed in an embodiment of the present application.

The number of the battery cells 20 in the battery module 200 may be set as any value according to different power demands. The plurality of battery cells 20 may be in series connection, in parallel connection or in series-parallel connection to achieve higher capacity or power. Since each battery 10 may comprise a relatively large number of battery cells 20, for ease of installation, the battery cells 20 are provided in groups, and each group of battery cells 20 constitutes a battery module 200. The number of the battery cells 20 included in the battery module 200 is not limited and may be set as required. For example, FIG. 3 shows an example of a battery module 200. The battery may comprise a plurality of battery modules 200, and the battery modules 200 may be in series connection, in parallel connection or in series-parallel connection.

Figure 4:
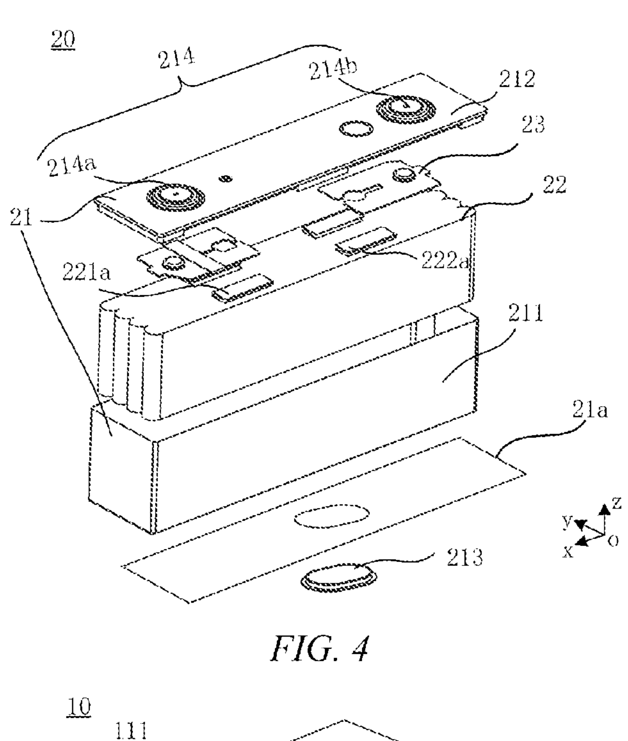
FIG. 4 is an exploded view of a battery cell disclosed in an embodiment of the present application.

FIG. 4 is a schematic structural diagram of a battery cell 20 according to an embodiment of the present application. The battery cell 20 comprises one or more electrode assemblies 22, a housing 211, and a cover plate 212. The housing 211 and the cover plate 212 form an enclosure 21. A wall of the housing 211 and the cover plate 212 are referred to as walls of the battery cell 20. The housing 211 may be determined depending on the shape of a combination of the one or more electrode assemblies 22. For example, the housing 211 may be a hollow cuboid, cube, or cylinder, and one of faces of the housing 211 has an opening such that the one or more electrode assemblies 22 can be placed in the housing 211. For example, when the housing 211 is a hollow cuboid or cube, one of flat faces of the housing 211 is an open face, that is, this flat face has no wall such that the inside of the housing 211 is in communication with the outside. When the housing 211 may be a hollow cylinder, an end face of the housing 211 is an open face, that is, this end face has no wall such that the inside of the housing 211 is in communication with the outside. The cover plate 212 covers the opening and is connected to the housing 211 to form an enclosed chamber for placing the electrode assemblies 22. The housing 211 is filled with an electrolyte, such as an electrolytic solution.

The battery cell 20 may further include two electrode terminals 214, and the two electrode terminals 214 may be disposed on the cover plate 212. The cover plate 212 is generally in the shape of a flat plate, the two electrode terminals 214 are fixed to a flat-plate face of the cover plate 212, and the two electrode terminals 214 are respectively a first electrode terminal **214*a* and a second electrode terminal 214*b*. The two electrode terminals 214 have opposite polarities. For example, when the first electrode terminal 214*a* is a positive electrode terminal, the second electrode terminal 214*b* is a negative electrode terminal. Each of the electrode terminals 214 is correspondingly provided with a connecting member 23, which is located between the cover plate 212 and the electrode assembly 22 to electrically connect the electrode assembly 22 to the electrode terminal 214**.

As shown in FIG. 4, each electrode assembly 22 has a first tab **221*a* and a second tab 222*a*. The first tab 221*a* and the second tab 222*a* have opposite polarities. For example, when the first tab 221*a* is a positive electrode tab, the second tab 222*a* is a negative electrode tab. The first tab 221*a* of the one or more electrode assemblies 22 is connected to an electrode terminal by means of a connecting member 23, and the second tab 222*a* of the one or more electrode assemblies 22 is connected to another electrode terminal by means of another connecting member 23. For example, the positive electrode terminal 214*a* is connected to the positive electrode tab by means of a connecting member 23, and the negative electrode terminal 214*b* is connected to the negative electrode tab by means of another connecting member 23**.

In the battery cell 20, according to the demands in actual use, one or more electrode assemblies 22 may be provided. As shown in FIG. 4, four independent electrode assemblies 22 are provided in the battery cell 20.

As shown in FIG. 4, a pressure relief mechanism 213 may be further provided on one wall of the battery cell 20. For example, a pressure relief mechanism 213 may be provided on a first wall **21*a* of the battery cell 20. In FIG. 4, the first wall 21*a* is separated from the housing 211, that is, a bottom side of the housing 211 has an opening, and the first wall 21*a* covers the bottom side opening and is connected to the housing 211 in a connection manner which may be welding, gluing, etc. Alternatively, the first wall 21*a* and the housing 211 may also have an integral structure. The pressure relief mechanism 213 is used to be actuated, when the internal pressure or temperature of the battery cell 20** reaches a threshold, to relieve the internal pressure or heat.

The pressure relief mechanism 213 may be a part of the first wall **21*a* or may be split from the first wall 21*a* and fixed to the first wall 21*a* by means of welding, for example. When the pressure relief mechanism 213 is a part of the first wall 21*a*, the pressure relief mechanism 213 may, for example, be formed by providing an indentation on the first wall 21*a*, and the first wall 21*a* corresponding to the indentation has a thickness less than that of other regions of the pressure relief mechanism 213 other than the indentation. The indentation is the weakest position of the pressure relief mechanism 213. When excessive gas produced by the battery cell 20 causes the internal pressure of the housing 211 to rise and reach a threshold, or the heat generated by an internal reaction of the battery cell 20 causes the internal temperature of the battery cell 20 to rise and reach a threshold, the pressure relief mechanism 213 can fracture at the indentation, resulting in the communication between the inside and outside of the housing 211, and the gas pressure and heat are released to the outside through the cracking of the pressure relief mechanism 213, thereby preventing explosion of the battery cell 20**.

Optionally, in an embodiment of the present application, as shown in FIG. 4, when the pressure relief mechanism 213 is disposed on the first wall 21*a* of the battery cell 20, a second wall of the battery cell 20, which is different from the first wall 21*a*, is provided with an electrode terminal 214.

Optionally, the second wall is disposed opposite to the first wall 21*a*. For example, the first wall 21*a* may be a bottom wall of the battery cell 20, and the second wall may be a cover plate 212 of the battery cell 20.

The pressure relief mechanism 213 and the electrode terminal 214 are provided on different walls of the battery cell 20, such that the emissions of the battery cell 20 can be farther away from the electrode terminal 214 when the pressure relief mechanism 213 is actuated, which reduces the influence of the emissions on the electrode terminal 214 and a busbar component, thereby enhancing the safety of the battery.

Further, when the electrode terminal 214 is disposed on the cover plate 212 of the battery cell 20, the pressure relief mechanism 213 is disposed on the bottom wall of the battery cell 20, so that the emissions of the battery cell 20 can be discharged to the bottom of a battery 10 when the pressure relief mechanism 213 is actuated. In this way, on the one hand, the thermal management component at the bottom of the battery 10 can be used to reduce the risk of the emissions; and on the other hand, when the battery 10 is disposed in a vehicle, the bottom of the battery 10 is usually far away from a passenger, thereby reducing harm to the passenger.

The pressure relief mechanism 213 may be of a variety of possible pressure relief structures, which will not be limited in the embodiments of the present application. For example, the pressure relief mechanism 213 may be a temperature-sensitive pressure relief mechanism that is configured to melt when the internal temperature of the battery cell 20 provided with the pressure relief mechanism 213 reaches a threshold; and/or the pressure relief mechanism 213 may be a pressure-sensitive pressure relief mechanism that is configured to fracture when the internal pressure of the battery cell 20 provided with the pressure relief mechanism 213 reaches a threshold.

In order to adjust the temperature of the battery cell 20, a thermal management component may be provided below the battery cell 20. Specifically, the thermal management component may be used to accommodate a fluid to adjust the temperature of the battery cell 20, and when the pressure relief mechanism 213 is actuated, the thermal management component can reduce the temperature of the emissions from the battery cell 20 provided with the pressure relief mechanism 213.

Figure 5:
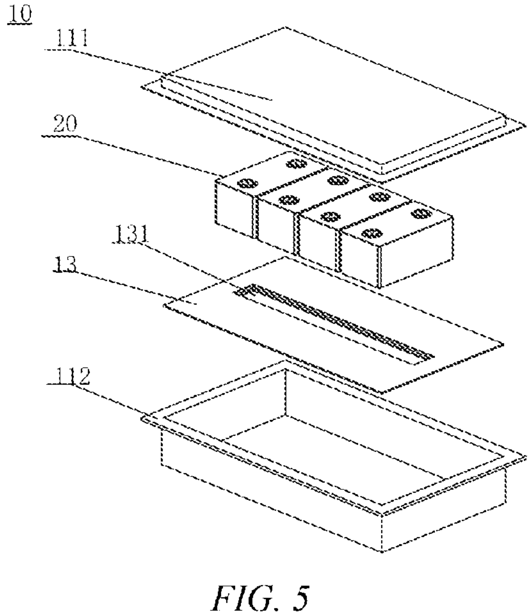
FIG. 5 is a schematic exploded structural diagram of another battery disclosed in an embodiment of the present application.

FIG. 5 shows another exploded view of a battery 10 according to an embodiment of the present application. As shown in FIG. 5, the battery 10 comprises a plurality of battery cells 20. For any of the plurality of battery cells 20, a first wall 21*a* of the battery cell 20 is provided with a pressure relief mechanism 213. The pressure relief mechanism 213 is used to be actuated, when an internal pressure or temperature of the battery cell 20 reaches a threshold, to relieve the internal pressure. Optionally, any of the plurality of battery cells 20 may be a battery cell shown in FIG. 4, and correspondingly, the first wall 21*a* of the battery cell 20 is the bottom wall of the housing 211 where the pressure relief mechanism 213 is located, which will not be limited in the embodiments of the present application.

As shown in FIG. 5, the battery 10 further comprises a thermal management component 13 used to accommodate a fluid to adjust the temperature of the battery cell 20. Specifically, a first surface of the thermal management component 13 is attached to the first wall 21*a*, the first surface is provided with an avoidance region 131 corresponding to the pressure relief mechanism 213, and the avoidance region 131 is configured to provide a deformation space for the pressure relief mechanism 213 when the pressure relief mechanism 213 is actuated. In addition, a destruction assisting substance 1311 is provided in the avoidance region 131, and the destruction assisting substance 1311 is used to assist in destroying the thermal management component 13 when the pressure relief mechanism 213 is actuated, so that the fluid is discharged from the inside of the thermal management component 13.

Therefore, in the battery 10 according to the embodiment of the present application, the thermal management component 13 is provided below the plurality of battery cells 20. The first surface of the thermal management component 13 is provided with the avoidance region 131 corresponding to the pressure relief mechanism 213, and the destruction assisting substance 1311 is provided in the avoidance region 131. In this way, when the battery cells 20 are subjected to thermal runaway, the pressure relief mechanism 213 is actuated, and the destruction assisting substance 1311 can assist in the destruction of the thermal management component 13 by the emissions discharged from the battery cells 20, so that the thermal management component 13 can be more easily destroyed, and thus the internal fluid is discharged from the thermal management component 13 in a timely manner to reduce the temperature in a timely manner. In particular, the temperature of the thermally runaway battery cells 20 is reduced in a timely manner, so that a risk of thermal diffusion inside the battery 10 can be reduced. This can not only reduce economic losses, but also ensure life safety of people.

In the embodiment of the present application, the destruction assisting substance 1311 may be selected based on actual application. Optionally, a substance that can release oxygen under the action of the emissions of the battery cell 20 when the pressure relief mechanism 213 is actuated may be selected as the destruction assisting substance 1311. Specifically, considering that when the battery cells 20 are subjected to thermal runaway, the pressure relief mechanism 213 is actuated to release a large amount of heat, and combustion may also occur. Thus, a substance that can react at high temperature and release oxygen may be selected, so that the released oxygen promotes the combustion of the thermally runaway battery cells 20, thereby increasing the temperature of the thermal management component 13. In particular, the local temperature of the avoidance region 131 where the destruction assisting substance 1311 is located is increased, and then the area of a region that is broken through and melted on the thermal management component 13 is increased, so that the internal fluid flows out in a timely manner, thereby achieving a cooling effect.

For example, the destruction assisting substance 1311 may comprise at least one of zinc sulfate, potassium permanganate, and potassium chlorate. At high temperature, the zinc sulfate reacts as $2ZnSO_4=2ZnO+2SO_2+O_2$, thereby releasing oxygen. At high temperature, the potassium permanganate reacts as $2KMnO_4=K_2MnO_4+MnO_2+O_2$. At high temperature, the potassium chlorate reacts as $2KClO_3=2KCl+3O_2$.

Optionally, a substance that can release heat under the action of the emissions of the battery cell 20 when the pressure relief mechanism 213 is actuated may also be selected as the destruction assisting substance 1311. For example, considering that aluminum may usually be selected as the material of the thermal management component 13, the destruction assisting substance 1311 may be selected based on an aluminothermic reaction. For example, the destruction assisting substance 1311 may comprise at least one of iron oxide, ferroferric oxide, manganese dioxide, vanadium pentoxide, and chromium oxide. In this way, aluminum is oxidized into aluminum oxide through the aluminothermic reaction (oxidation-reduction reaction) and a large amount of heat can be released, so that the large-area thermal management component 13 can be instantaneously melted under high temperature, so as to achieve the purpose of locally and rapidly reducing the temperature of the battery 10 by means of the outflowing internal fluid.

Optionally, in the embodiment of the present application, the destruction assisting substance 1311 may be in powder form. It should be understood that when the destruction assisting substance 1311 is a powdery substance, the destruction assisting substance 1311 may be wrapped in an encapsulation film to facilitate the arrangement of the destruction assisting substance in the avoidance region and to avoid its influence on other components. Specifically, the encapsulation film may be an aluminum-plastic film, a PP film, or a PC film, or may be another low-melting-point material, and the encapsulated destruction assisting substance 1311 may be bonded and fixed into the avoidance region 131 by using an external encapsulation film, thereby fixing the destruction assisting substance 1311.

The avoidance cavity 131 of the thermal management component 13 and the destruction assisting substance 1311 in the embodiment of the present application will be described in detail below in conjunction with the accompanying drawings.

Figure 6:
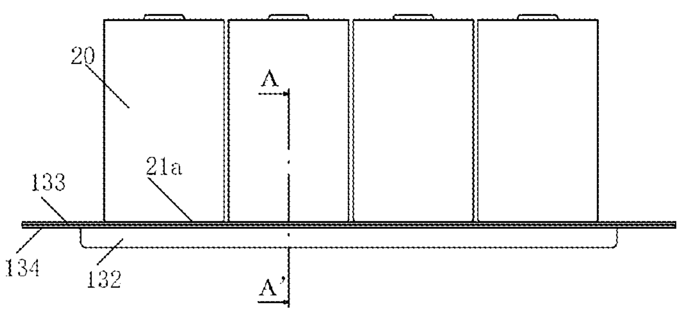
FIG. 6 is a side view of a battery cell and a thermal management component disclosed in an embodiment of the present application.
Figure 7:
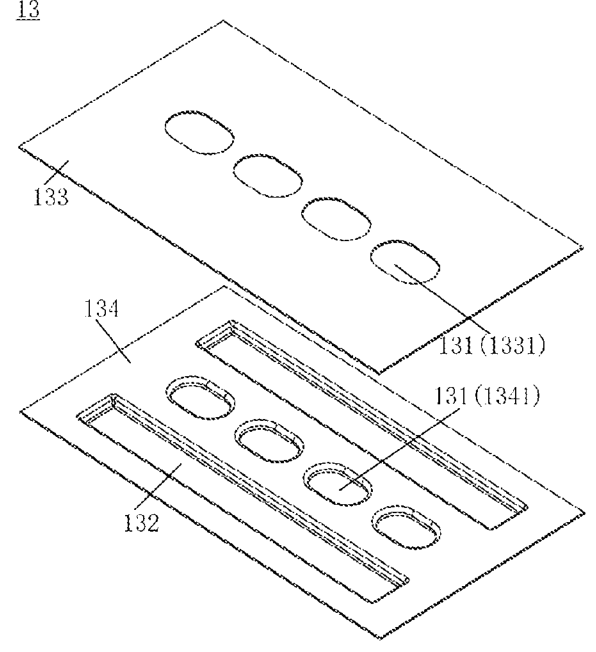
FIG. 7 is an exploded view of a thermal management component disclosed in an embodiment of the present application.
Figure 8:
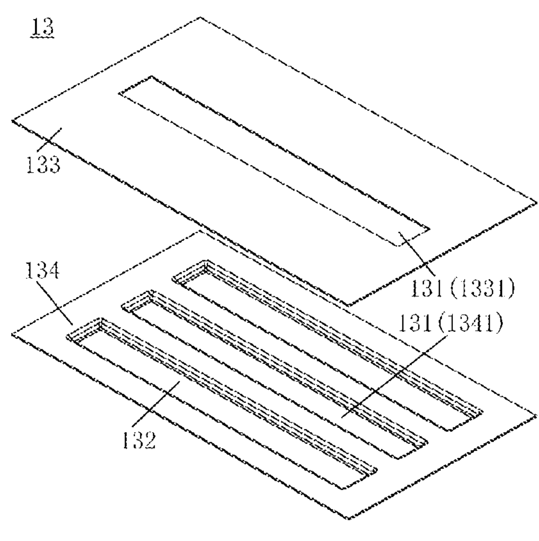
FIG. 8 is an exploded view of another thermal management component disclosed in an embodiment of the present application.

FIG. 6 shows a side view of a plurality of battery cells 20 and a thermal management component 13 in a battery 10 according to an embodiment of the present application after installation, and FIGS. 7 and 8 are multiple possible schematic exploded diagrams of a thermal management component 13 according to an embodiment of the present application. Specifically, as shown in FIGS. 6 to 8, the thermal management component 13 in the embodiment of the present application may comprise a first thermally conductive plate 133 and a second thermally conductive plate 134, the first thermally conductive plate 133 being located between a first wall 21*a* and the second thermally conductive plate 134 and attached to the first wall 21*a*.

It should be understood that in the embodiment of the present application, the thermal management component 13 may be provided with a flow channel 132 to accommodate a fluid. Optionally, the configuration position of the flow channel 132 may be set based on actual application. For example, as shown in FIGS. 5 to 8, the flow channel 132 may be provided around the avoidance region 131, and for example, may be provided on two sides of the avoidance region 131, and the flow channel 132 may also extend in a direction in which a plurality of battery cells 20 are arranged. For another example, the flow channel 132 may be formed by providing a groove in the second thermally conductive plate 134, that is, the second thermally conductive plate 134 is provided with a groove, which has an opening facing the first thermally conductive plate 133, to form the flow channel 132. For another example, the flow channel 132 may be sized depending on the sizes of the thermal management component 13, the battery 10, and the battery cell 20, which will not be limited in the embodiment of the present application.

Optionally, in the embodiment of the present application, the number of avoidance regions 131 of the thermal management component 13 may be set based on actual application. For example, any of the avoidance regions 131 of the thermal management component 13 may correspond to one or more pressure relief mechanisms 213, which will not be limited in the embodiment of the present application.

Optionally, taking FIG. 7 as an example, in the embodiment of the present application, the avoidance regions 131 may correspond to the pressure relief mechanisms 213 on a one-to-one basis, that is, each avoidance region 131 corresponds to one pressure relief mechanism 213. Specifically, the avoidance region 131 can be sized and shaped depending on the size and shape of the pressure relief mechanism 213. For example, the shape of the avoidance region 131 may be consistent with that of the pressure relief mechanism 213, while the area of the avoidance region 131 is generally greater than that of the pressure relief mechanism 213. Taking FIG. 7 as an example, considering that the pressure relief mechanism 213 may be generally set in an elliptical runway shape, the avoidance region 131 may also be consistent with the pressure relief mechanism 213 and also set in the runway shape shown in FIG. 7, which will not be limited in the embodiment of the present application.

Optionally, taking FIG. 5 or 8 as an example, in the embodiment of the present application, the avoidance regions 131 may also correspond to a plurality of pressure relief mechanisms 213. For example, each avoidance region 131 may correspond to a plurality of pressure relief mechanisms 213 located in a same column. Specifically, as shown in FIG. 8, considering that a plurality of battery cells 20 included in the battery 10 may be arranged as a plurality of columns of battery cells 20, and a plurality of battery cells 20 in a same column may correspond to the same avoidance region 131, the avoidance region 131 may be in a strip shape. For example, an extension direction of the avoidance region 131 may be consistent with an extension direction of the flow channel 132. In addition, the avoidance region 131 has a width greater than or equal to that of the pressure relief mechanism 213, which will not be limited in the embodiment of the present application.

It should be understood that the avoidance region 131 in the embodiment of the present application may be a through hole or a groove. Specifically, if the avoidance region 131 is a through hole, a first region of the first thermally conductive plate 133 corresponding to the pressure relief mechanism 213 and a second region of the second thermally conductive plate 134 corresponding to the first region both comprise a through hole to form the avoidance region 131.

Alternatively, if the avoidance region 131 is a groove, the groove as the avoidance region 131 may be formed in multiple ways. For example, as shown in FIG. 7 or 8, the first region of the first thermally conductive plate 133 corresponding to the pressure relief mechanism 213 may comprise a through hole 1331, and the second region of the second thermally conductive plate 134 corresponds to the first region. The second region protrudes in a direction away from the first thermally conductive plate 133 to form a groove, which is referred to as a fourth groove 1341 herein, and the fourth groove 1341 is the avoidance region 131.

Figure 9:
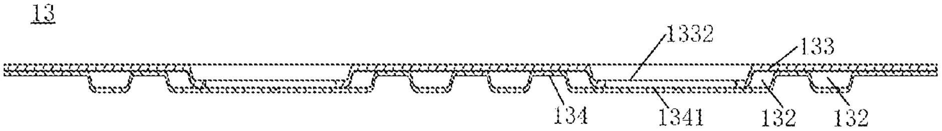
FIG. 9 is a cross-sectional view of a thermal management component disclosed in an embodiment of the present application.

For another example, the groove-type avoidance region 131 may also be formed in other ways. FIG. 9 shows a cross-sectional view of a thermal management component 13 according to an embodiment of the present application. An avoidance region 131 may also be formed by stacking two grooves. Specifically, as shown in FIG. 9, a first region of a first thermally conductive plate 133 is provided with a third groove 1332, the third groove 1332 is the avoidance region 131, a second region of a second thermally conductive plate 134 corresponds to the first region, the second region is provided with a fourth groove 1341, and the third groove 1332 is located in the fourth groove 1341, that is, the fourth groove has a size greater than that of the third groove 1332. Optionally, a bottom wall of the third groove 1332 may also be provided with a through hole to reduce the area of a bottom wall of the avoidance region 131, thereby making the avoidance region 131 more easily destroyed.

In addition, a flow channel 132 may also be formed between a side wall of the third groove 1332 and a side wall of the fourth groove 1341 to accommodate the fluid. In this way, when the pressure relief mechanism 213 is actuated, the flow channel 132 can be more directly destroyed by means of destroying the side wall of the third groove 1332, so that the fluid in the flow channel 132 flows out to achieve a cooling effect.

In the embodiment of the present application, if the avoidance region 131 is a through hole, the destruction assisting substance 1311 may be disposed on a side wall of the through hole. If the avoidance region 131 is a groove, the destruction assisting substance 1311 may be disposed on a bottom wall or a side wall of the groove. For ease of description, an example in which the avoidance region 131 is a groove is taken below for description, that is, the thermal management component 13 is provided with a first groove that is the avoidance region 131. Then, when the avoidance region 131 is a through hole, the manner of arranging the destruction assisting substance 1311 on a side wall of the through hole may be the same as that of arranging the destruction assisting substance on the side wall of the groove, which will not be described herein again.

In addition, for ease of description, the avoidance region 131 shown in FIG. 8 is taken as an example for description below. In this case, the first region of the first thermally conductive plate 133 of the thermal management component 13 corresponding to the pressure relief mechanism 213 may comprise a through hole 1331, the second region of the second thermally conductive plate 134 corresponds to the first region, and the second region protrudes in a direction away from the first thermally conductive plate 133 to form a groove, such that the first groove forming the avoidance region 131 is the fourth groove 1341 in the second thermally conductive plate 134.

Optionally, in an embodiment, the destruction assisting substance 1311 may be disposed on a side wall of the first groove 1341. Specifically, the destruction assisting substance 1311 may be directly disposed on a surface of the side wall of the first groove 1341, or the side wall of the first groove 1341 may be provided with a groove, such that the destruction assisting substance 1311 is disposed in the groove.

Figure 10:
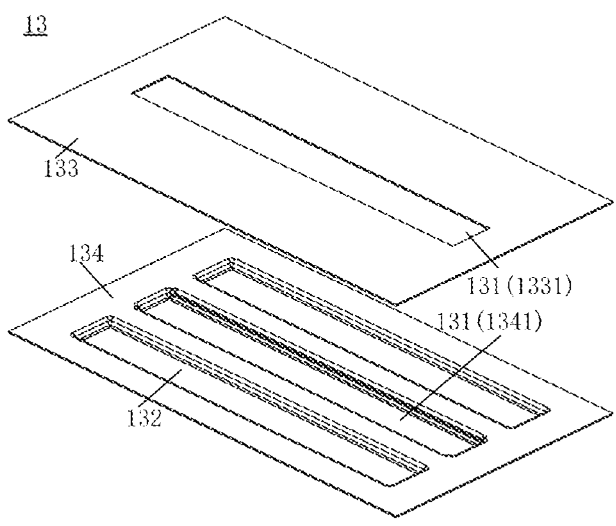
FIG. 10 is an exploded view of still another thermal management component disclosed in an embodiment of the present application.
Figure 11:
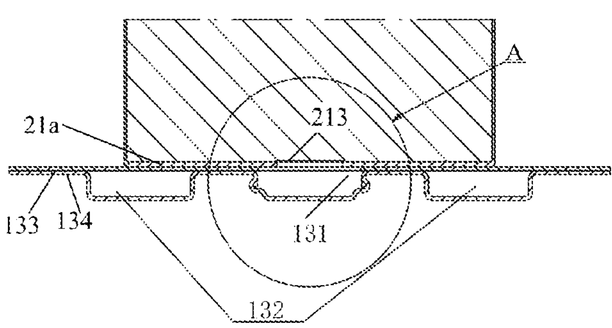
FIG. 11 is a cross-sectional view of a battery cell and a thermal management component disclosed in an embodiment of the present application.
Figure 12:
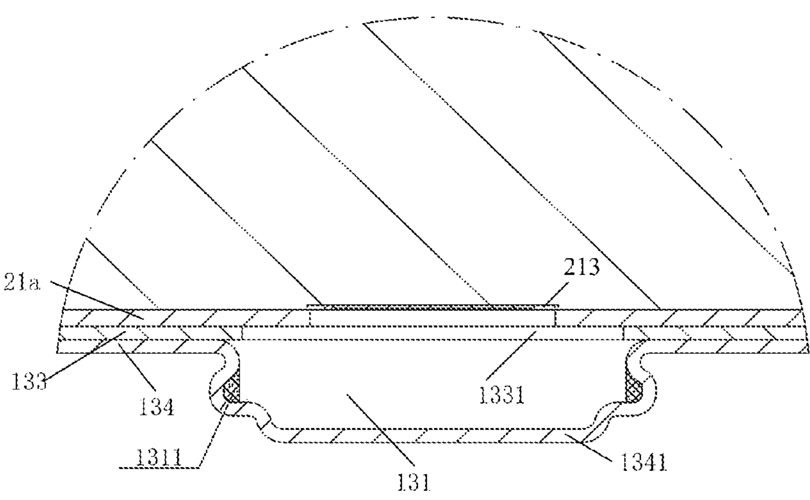
FIG. 12 is a partial enlarged view of FIG. 11.

Optionally, in the case where the destruction assisting substance 1311 is disposed in the groove in the side wall of the first groove 1341, FIG. 10 shows an exploded view of a thermal management component 13, FIG. 11 shows a cross-sectional view of a battery cell 20 and a thermal management component 13, which, for example, may be a cross-sectional view in a direction A-A' indicated in FIG. 6, and FIG. 12 is a partial enlarged view of a region A in FIG. 11. As shown in FIGS. 10 to 12, a side wall of a first groove 1341 serving as an avoidance region 131 may be provided with a groove, which is referred to as a fifth groove herein, and the fifth groove has an opening facing the inside of the first groove 1341 to accommodate a destruction assisting substance 1311. Optionally, any of the first grooves 1341 may be internally provided with one or more fifth grooves to accommodate the destruction assisting substance 1311.

It should be understood that the width of the avoidance region 131 is set to be greater than that of the pressure relief mechanism 213, such that the opening of the pressure relief mechanism 213 will not be affected even if more destruction assisting substances 1311 are provided. For example, the destruction assisting substance 1311 has a thickness usually ranging from 3 mm to 10 mm. When the side wall of the first groove 1341 is provided with a fifth groove, which has a depth that may be set depending on the thickness of the destruction assisting substance 1311. For example, the depth of the fifth groove may be set to be greater than the thickness of the destruction assisting substance 1311.

Optionally, in another embodiment, the destruction assisting substance 1311 may also be disposed on a bottom wall of the first groove 1341. Specifically, similar to being disposed on the side wall of the first groove 1341, the destruction assisting substance 1311 may be disposed on a surface of the bottom wall of the first groove 1341, or the bottom wall of the first groove 1341 may also be provided with a groove to accommodate the destruction assisting substance 1311.

Figure 13:
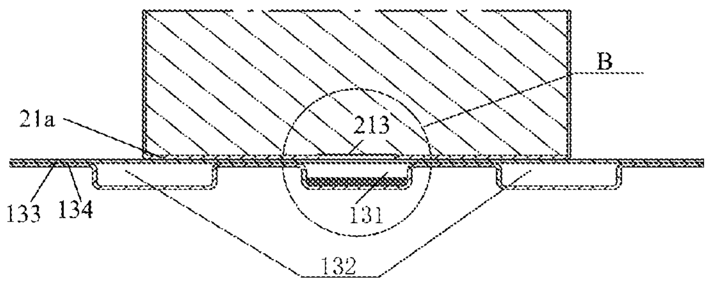
FIG. 13 is a cross-sectional view of another battery cell and a thermal management component disclosed in an embodiment of the present application.
Figure 14:
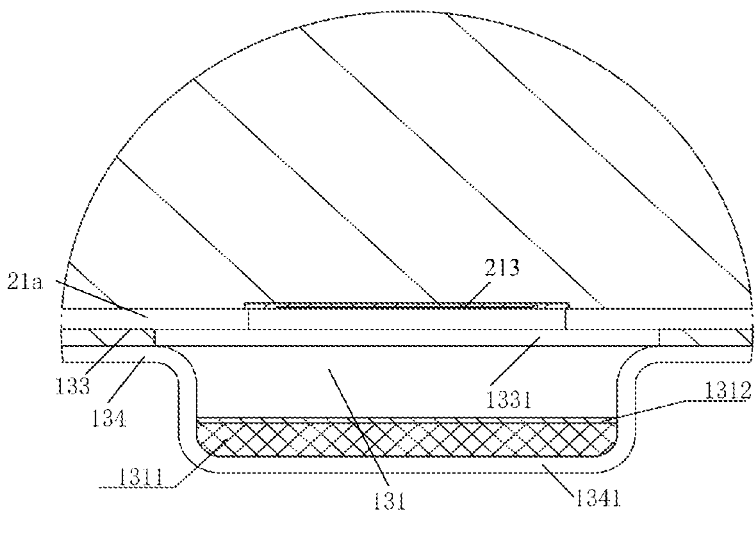
FIG. 14 is a partial enlarged view of FIG. 13.

It should be understood that, in the case where the destruction assisting substance 1311 is disposed on the surface of the bottom wall of the first groove 1341, FIG. 13 shows a cross-sectional view of a battery cell 20 and a thermal management component 13, which, for example, may be a cross-sectional view in a direction A-A' indicated in FIG. 6, and FIG. 14 shows a partial enlarged view of a region B in FIG. 13. As shown in FIGS. 13 and 14, a destruction assisting substance 1311 may be disposed on a surface of a bottom wall of a first groove 1341.

Figure 15:
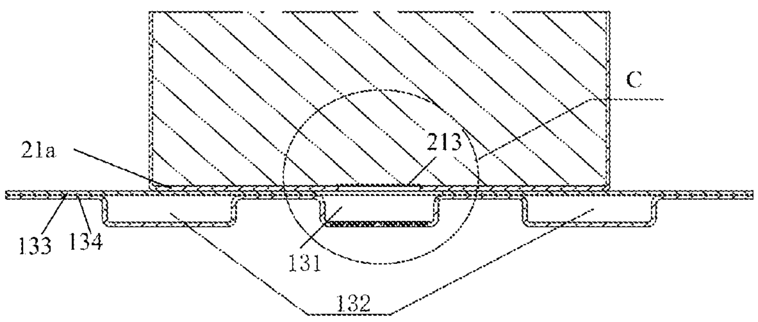
FIG. 15 is a cross-sectional view of still another battery cell and a thermal management component disclosed in an embodiment of the present application.
Figure 16:
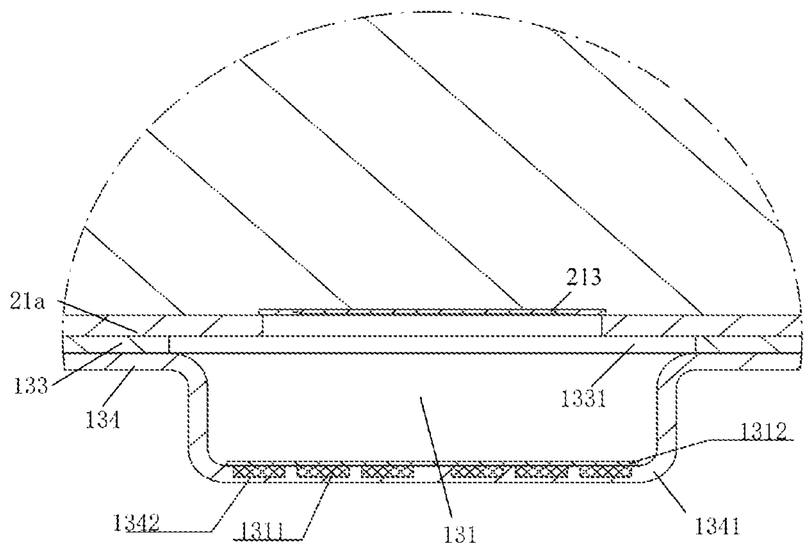
FIG. 16 is a partial enlarged view of FIG. 15.

In the case where the destruction assisting substance 1311 is disposed in a groove in the bottom wall of the first groove 1341, FIG. 15 shows a cross-sectional view of a battery cell 20 and a thermal management component 13, which, for example, may be a cross-sectional view in a direction A-A' indicated in FIG. 6, and FIG. 16 shows a partial enlarged view of a region C in FIG. 15. As shown in FIGS. 15 and 16, a bottom wall of a first groove 1341 may be provided with one or more second grooves 1342, so that the destruction assisting substance 1311 is disposed in the second groove 1342, for example, may be disposed on a bottom wall of the second groove 1342.

Optionally, considering that the destruction assisting substance 1311 may be in powder form, as shown in FIGS. 13 to 16, an encapsulation film 1312 may be provided on a surface of the destruction assisting substance 1311 to seal the destruction assisting substance 1311 to prevent the destruction assisting substance 1311 from entering other regions and affecting other components. Optionally, the encapsulation film may be an aluminum-plastic film, a PP film, or a PC film, or may be another low-melting-point material.

Optionally, considering that the first groove 1341 has a limited depth while the destruction assisting substance 1311 may occupy a space in a depth direction when disposed on a bottom wall of the first groove 1341, the thickness of the destruction assisting substance 1311 should be set reasonably in order not to affect a deformation space required when the pressure relief mechanism 213 is actuated. For example, as shown in FIGS. 15 and 16, the thickness of the destruction assisting substance 1311 may be set to be less than or equal to the depth of the second groove 1342. For example, considering that the thickness of the bottom wall of the first groove 1341 is usually less than or equal to 3 mm, the thickness of the destruction assisting substance 1311 may be set to be less than or equal to 2 mm. Alternatively, as shown in FIGS. 13 and 14, considering the deformation space required when the pressure relief mechanism 213 is actuated, the thickness of the destruction assisting substance 1311 may be set to be less than or equal to 2 mm.

In the battery 10 according to the embodiment of the present application, a thermal management component 13 is provided below a plurality of battery cells 20. A first surface of the thermal management component 13 is provided with an avoidance region 131 corresponding to the pressure relief mechanism 213. The destruction assisting substance 1311 is disposed in the avoidance region 131. In this way, when the battery cells 20 are subjected to thermal runaway, the pressure relief mechanism 213 is actuated, and the destruction assisting substance 1311 can be excited by emissions discharged from the battery cells 20 to release a gas beneficial to combustion or release more heat, so that the destruction assisting substance 1311 can assist in destroying the thermal management component 13, so that the thermal management component 13 can be more easily destroyed in a larger area, and thus the internal fluid is discharged from the thermal management component 13 in a timely manner to reduce the temperature in a timely manner, especially reduce, in a timely manner, the temperature of the thermally runaway battery cells 20, thereby preventing explosion of the entire battery 10 caused by spread of fire. In addition, when the battery cells 20 catch fire and the fire is weakened and extinguished, the battery 10 will not further burn to release heat, which is beneficial to the cooling of the battery 10 and ultimately reduces a risk of thermal diffusion in the battery 10. This can not only reduce economic losses, but also ensure life safety of people.

The battery 10 according to the embodiment of the present application is described above, and a method and device for manufacturing a battery 10 according to embodiments of the present application will be described below. For the parts not described in detail, reference may be made to the foregoing embodiments.

Figure 17:
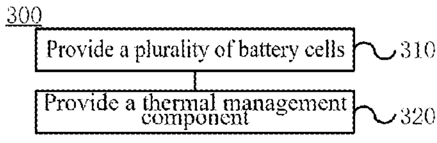
FIG. 17 is a schematic flowchart of a method for manufacturing a battery disclosed in an embodiment of the present application.

FIG. 17 shows a schematic flowchart of a method 300 for manufacturing a battery according to an embodiment of the present application. As shown in FIG. 17, the method 300 may comprise the following steps: S310, providing a plurality of battery cells, a first wall of the battery cell being provided with a pressure relief mechanism that is used to be actuated, when an internal pressure or temperature of the battery cell reaches a threshold, to relieve the internal pressure; and S320, providing a thermal management component that is used to accommodate a fluid to adjust the temperature of the battery cell, wherein a first surface of the thermal management component is attached to the first wall, the first surface is provided with an avoidance region corresponding to the pressure relief mechanism, the avoidance region is used to provide a deformation space for the pressure relief mechanism when the pressure relief mechanism is actuated, a destruction assisting substance is provided in the avoidance region, and the destruction assisting substance is used to assist in destroying the thermal management component when the pressure relief mechanism is actuated, so that the fluid is discharged from the inside of the thermal management component.

Figure 18:
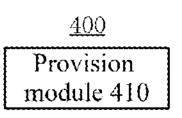
FIG. 18 is a schematic block diagram of a device for manufacturing a battery disclosed in an embodiment of the present application.

FIG. 18 shows a schematic block diagram of a device 400 for manufacturing a battery according to an embodiment of the present application. As shown in FIG. 18, the device 400 may comprise a provision module 410. The provision module 410 is configured for: providing a plurality of battery cells, a first wall of the battery cell being provided with a pressure relief mechanism that is used to be actuated, when an internal pressure or temperature of the battery cell reaches a threshold, to relieve the internal pressure; and providing a thermal management component that is used to accommodate a fluid to adjust the temperature of the battery cell, wherein a first surface of the thermal management component is attached to the first wall, the first surface is provided with an avoidance region corresponding to the pressure relief mechanism, the avoidance region is used to provide a deformation space for the pressure relief mechanism when the pressure relief mechanism is actuated, a destruction assisting substance is provided in the avoidance region, and the destruction assisting substance is used to assist in destroying the thermal management component when the pressure relief mechanism is actuated, so that the fluid is discharged from the inside of the thermal management component.

It should be understood that the method 300 and device 400 for manufacturing a battery according to the embodiments of the present application may be used for manufacturing the battery 10 according to the embodiments of the present application, for brevity, which will not be described herein again.

While the present application has been described with reference to the preferred embodiments, various modifications can be made, and equivalents can be provided to substitute for the components thereof without departing from the scope of the present application. In particular, the technical features mentioned in the embodiments can be combined in any manner, as long as there is no structural conflict. The present application is not limited to the specific embodiments disclosed herein but includes all the technical solutions that fall within the scope of the claims.

The invention claimed is:

1. A battery, characterized by comprising:

a plurality of battery cells, a first wall of each of the plurality of battery cells being provided with a pressure relief mechanism, the pressure relief mechanism being configured to be actuated, when an internal pressure or temperature of the battery cell reaches a threshold, to relieve the internal pressure; and a thermal management component configured to accommodate a fluid to adjust the temperature of the battery cell, wherein a first surface of the thermal management component is attached to the first wall, the first surface is provided with an avoidance region corresponding to the pressure relief mechanism, wherein the avoidance region is configured to provide a deformation space for the pressure relief mechanism when the pressure relief mechanism is actuated, wherein a destruction assisting substance is provided in the avoidance region, and the destruction assisting substance is configured to assist in destroying the thermal management component when the pressure relief mechanism is actuated, so that the fluid is discharged from the inside of the thermal management component.

2. The battery according to claim 1, characterized in that the destruction assisting substance is used to release oxygen under the action of emissions of the battery cell when the pressure relief mechanism is actuated.

3. The battery according to claim 2, characterized in that the destruction assisting substance comprises at least one of zinc sulfate, potassium permanganate, and potassium chlorate.

4. The battery according to claim 1, characterized in that the destruction assisting substance is used to release heat under the action of the emissions of the battery cell when the pressure relief mechanism is actuated.

5. The battery according to claim 4, characterized in that the destruction assisting substance comprises at least one of iron oxide, ferroferric oxide, manganese dioxide, vanadium pentoxide, and chromium oxide.

6. The battery according to claim 1, characterized in that the avoidance region is a through hole in the thermal management component.

7. The battery according to claim 6, characterized in that the destruction assisting substance is disposed on a side wall of the through hole.

8. The battery according to claim 1, characterized in that the avoidance region is a first groove in the thermal management component.

9. The battery according to claim 8, characterized in that the destruction assisting substance is disposed on a side wall of the first groove.

10. The battery according to claim 7, characterized in that the destruction assisting substance has a thickness ranging from 3 mm to 10 mm.

11. The battery according to claim 8, characterized in that the destruction assisting substance is disposed on a bottom wall of the first groove.

12. The battery according to claim 11, characterized in that the destruction assisting substance has a thickness less than or equal to 2 mm.

13. The battery according to claim 11, characterized in that the bottom wall of the first groove is provided with a second groove, and the destruction assisting substance is disposed on a bottom wall of the second groove.

14. The battery according to claim 13, characterized in that the destruction assisting substance has a thickness less than or equal to the depth of the second groove.

15. The battery according to claim 1, characterized in that the destruction assisting substance is wrapped in an encapsulation film.

16. The battery according to claim 15, characterized in that the encapsulation film is bonded and fixed in the avoidance region.

17. The battery according to claim 15, characterized in that the destruction assisting substance is in powder form.

18. The battery according to claim 15, characterized in that the encapsulation film is an aluminum-plastic film, a polypropylene film, or a polycarbonate film.

19. The battery according to claim 1, characterized in that the thermal management component is made of aluminum.

20. The battery according to claim 8, characterized in that the thermal management component comprises a first thermally conductive plate and a second thermally conductive plate, wherein the first thermally conductive plate is located between the first wall and the second thermally conductive plate and attached to the first wall, wherein a first region of the first thermally conductive plate has a through hole, and a second region of the second thermally conductive plate corresponds to the first region, wherein the second region protrudes in a direction away from the first thermally conductive plate to form the avoidance region.

* * * * *